(12) United States Patent
Bora et al.

(10) Patent No.: US 9,318,866 B2
(45) Date of Patent: Apr. 19, 2016

(54) SUB-WAVELENGTH PLASMON LASER (71) Applicant: Lawrence Livermore National Security, LLC, Livermore, CA (US)

(72) Inventors: Mihail Bora, Livermore, CA (US); Tiziana C. Bond, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 14/186,792

(22) Filed: Feb. 21, 2014

(65) Prior Publication Data

US 2014/0269806 A1 Sep. 18, 2014

Related U.S. Application Data

(60) Provisional application No. 61/799,793, filed on Mar. 15, 2013.

(51) Int. Cl.
*H01S 3/08* (2006.01)
*H01S 3/094* (2006.01)
*H01S 3/102* (2006.01)
*H01S 3/213* (2006.01)
*B82Y 20/00* (2011.01)

(52) U.S. Cl.
CPC . *H01S 3/08* (2013.01); *B82Y 20/00* (2013.01); *H01S 3/213* (2013.01); *H01S 3/08095* (2013.01); *H01S 3/09403* (2013.01); *H01S 3/094038* (2013.01); *H01S 3/1022* (2013.01); *Y10S 977/951* (2013.01)

(58) Field of Classification Search
None
See application file for complete search history.

(56) References Cited

U.S. PATENT DOCUMENTS

| 7,713,849 | B2* | 5/2010 | Habib et al. | 438/479 |
|---|---|---|---|---|
| 7,817,698 | B2* | 10/2010 | Li et al. | 372/53 |
| 2002/0080842 | A1* | 6/2002 | An et al. | 372/92 |
| 2003/0059820 | A1* | 3/2003 | Vo-Dinh | 435/6 |
| 2007/0140638 | A1* | 6/2007 | Yang et al. | 385/132 |
| 2010/0278474 | A1* | 11/2010 | Beausoleil et al. | H01S 5/1046 385/2 |
| 2012/0224255 | A1* | 9/2012 | Bora | B82Y 20/00 359/346 |

OTHER PUBLICATIONS

Mihail Bora et al., AIP Applied Physics Letters "Plasmonic black metals in resonant nonocavities" 102, 251105 (2013) 6 pages.

* cited by examiner

*Primary Examiner* — Jessica Stultz
*Assistant Examiner* — Sean Hagan
(74) *Attorney, Agent, or Firm* — Harness & Dickey (57) ABSTRACT

A plasmonic laser device has resonant nanocavities filled with a gain medium containing an organic dye. The resonant plasmon frequencies of the nanocavities are tuned to align with both the absorption and emission spectra of the dye. Variables in the system include the nature of the dye and the wavelength of its absorption and emission, the wavelength of the pumping radiation, and the resonance frequencies of the nanocavities. In addition the pumping frequency of the dye is selected to be close to the absorption maximum.

17 Claims, 5 Drawing Sheets

SUB-WAVELENGTH PLASMON LASER

CROSS-REFERENCE TO RELATED APPLICATIONS

This application claims the benefit of U.S. Provisional Application No. 61/799,793, filed on Mar. 15, 2013. The entire disclosure of the above application is incorporated herein by reference.

STATEMENT OF GOVERNMENT RIGHTS

The United States Government has rights in this invention pursuant to Contract No. DE-AC52-07NA27344, between the U.S. Department of Energy and Lawrence Livermore National Security, LLC, for the operation of Lawrence Livermore National Laboratory.

FIELD

The present disclosure relates to a sub-wave-length plasmon laser.

BACKGROUND

This section provides background information related to the present disclosure which is not necessarily prior art.

A plasmonic laser uses surface plasmons instead of light to pump a lasing medium (Noginov et al., Nature 2009, 460, 1110; Zhang et al. Surf. Sci. 2007, 601, 5445). Because of the short wavelength involved, there is the potential to reduce the dimensions of laser devices below the emission wavelength of the laser. As the size decreases, wafer device density and modulation can be increased. Other advantages include low power consumption for an individual device and the achievement of wide area emission from a laser array.

Tunable plasmon resonant cavities in the form of a wire array patterned on a fused silica substrate using laser interference lithography are disclosed in application US 2012-0224255 published on Sep. 6, 2012, the full disclosure of which is hereby incorporated by reference, along with a suggestion to provide a laser by filling resonant cavities with a gain medium. Further development is required to produce suitable plasmon lasers.

SUMMARY

This section provides a general summary of the disclosure, and is not a comprehensive disclosure of its full scope or all of its features.

In a system operating as a plasmonic laser, resonant nanocavities are provided that are filled with a gain medium comprising an organic dye. The dye is characterized by an absorption maximum and an emission maximum. A standard photonic laser is said to lase at the wavelength of the emission maximum. The resonant plasmon frequencies of the nanocavities are tuned to match both the absorption and emission spectra of the dye. To do this, minima in the reflectance spectrum of the cavity array are matched as closely as practical to the absorption maximum and to the emission maximum. Variables in the system include the nature of the dye and the wavelength of its absorption and emission, the wavelength of the pumping radiation, and the resonance frequencies of the nanocavities. In addition the pumping frequency of the dye is selected to be close to the absorption maximum.

In this way the laser uses surface plasmons to pump the active medium. The device size, on the order of 0.1 $\mu m^2$ cross section, is significantly smaller than the wavelength of the emitted light, and is made possible thanks to strong field confinement of plasmon modes in metallic nanostructures. The teachings provide a vertical laser structure amenable to high density (for example millions of devices per square millimeter, or 3.85 million devices/$mm^2$ in an example) and large area fabrication, requiring simpler growth and processing steps. It provides a cost effective alternative to existing diode lasers.

The plasmon waveguide configuration described herein can potentially deliver three orders of magnitude reduction in device size compared to current state of the art vertical cavity surface emitting lasers, a proportional increase in wafer device density, as well as record laser array dimension (plasmon nanocavities can be reliably fabricated on meter sized substrates). Coherent emission is possible from the entire array since individual laser devices are spaced within half of the emission wavelength. Large area stimulated emission can provide a path towards compact high power pump lasers for inertial confinement fusion. The high density laser array is also relevant to multichannel parallel data communication applications, as the bandwidth scales up with the number of channels in the array.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

In an aspect, the intensity of laser light produced by a plasmonic laser is enhanced by increasing both absorption and emission of the dye used as the gain medium in the laser. The enhancement is carried out by designing a cavity with (at least) two resonances that are aligned to dye absorption (extinction) and emission. In this aspect, absorbance of the dye inside the cavity is increased due to the high localized electromagnetic energy density, accounting for more efficient excitation that is proportional to the square of the electric field $E^2$. Emission is also increased by an $E^2$ factor due to more efficient coupling of dipole emission into the radiative modes.

Thus in one embodiment, the present teachings provide a plasmonic laser or laser system having a plurality of plasmon resonant cavities filled with an active gain medium. The system provides a source of radiation optically coupled to the gain medium for the purpose of pumping a dye (or a mixture of dyes) in the gain medium to achieve a population inversion. A dye in the gain medium has a maximum absorption at a first wavelength, and a maximum emission at a second wavelength, where the first and second wavelengths can be the same or different, depending on the system. The resonant cavities are tuned to adjust the resonant frequency to provide enhancement of absorption at the first wavelength, emission at the second wavelength, or both.

In one embodiment, a plasmon laser device comprises a metal covered nanocavity filled with a dye solution, wherein the absorption maximum and emission maximum of the dye substantially align with a plasmon resonance of the nanocavity.

In another embodiment, the plasmonic laser comprises plasmon resonant cavities filled with an active gain medium, as described further. The gain medium in one embodiment is a solution of an organic dye or a solution of a combination of dyes. The solvent dissolving the organic dye or dyes is selected from conventional organic solvents selected for their dissolution properties and even for their other properties, such as index of refraction discussed herein. In various embodiments, the gain medium comprises quantum dots.

In preparing plasmonic lasers based on the current teachings, resonances in the plasmonic resonant cavities will be adjusted or tuned by varying the geometry of the cavities, the material (metal) that the cavities are made of, and properties of the gain medium such as index of refraction. In this way, cavities can be fabricated having two or more resonant frequencies that enhance absorption and emission.

As some background, although the invention is not limited by theory, the enhanced radiative rate of an emitter placed within an optical cavity is proportional with the ratio between the quality factor Q and the mode volume V is proportional to the Purcell factor $F_P=(3/4\pi^2)(\lambda/n)^3(Q/V)$.

As a rule, higher quality factors and lower mode volumes are desired for low laser threshold. For current diode laser devices, the mode volume is typically on the order of $\lambda^3$, and the micro-cavity quality factor is on the order of $10^4$. The optical wavelength size limit of the microcavity can be overcome by using resonant cavities that support shorter wavelength surface plasmons, which are electromagnetic surface charge density waves that propagate at the interface between metal and dielectric media. The devices described herein rely on previously demonstrated surface plasmon nanocavities that have a mode volume that is three orders of magnitude smaller than the wavelength of light and a lower quality factor (10-50) for a comparable Purcell factor (see Nano Lett. 2010, 10, 2832-2837)).

The plasmon resonant cavity is supported on a two nanowire waveguide and the modes are excited by an external light source. The active medium (laser dye) is pumped in the cavity by external excitation of the sub-wavelength plasmon modes in order to achieve population inversion. The plasmon laser will require precise alignment between the nanocavity plasmon resonance and the absorbance characteristics of the laser dye.

The lower limit of resonant mode wavelength in the cavity is given by the absorption band of the metal waveguide (400 and 500 nm in the case of silver and gold). The active media that can be used for the plasmon laser are therefore limited to materials with absorbance maxima above 400 nm. Using commercially available excimer excitation dyes, the laser emission can be tuned from 450 to 1000 nm. One of the prime candidates, Rhodamine 6G, with a maximum absorbance band at 532 nm, is chosen for its high photoluminescence efficiency, in excess of 90%. The Rhodamine 6G plasmon laser is expected to emit around 650 nm.

Plasmon Resonant Nanocavities

Figure 1:
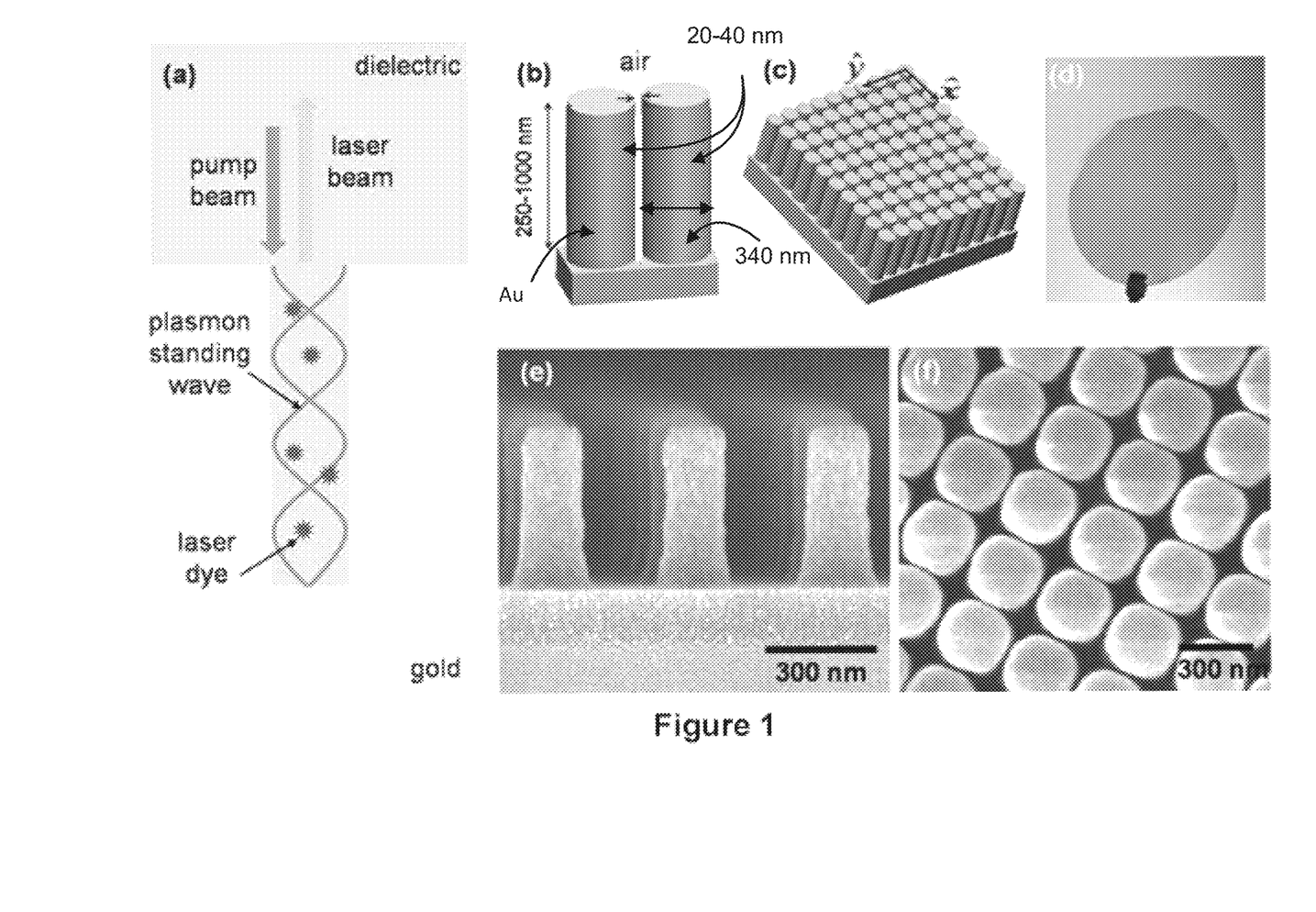
FIG. 1 illustrates the 2-dimensional rectangular array of vertical resonant cavities used in the plasmonic laser device.

The resonant cavity relies on paired nanowire waveguides that support propagation of gap plasmon modes (FIG. 1a,b) when the separation is less than 50 nm. The nanowires can also be referred to as nanopillars. The cavity is delimited by a reflective metallic mirror at one side and an open end on the other for a more effective incident light-plasmon coupling. Resonances occur when the cavity length is an odd multiple of quarter plasmon wavelengths due to boundary conditions of node at the mirror and anti-node at the open end. A two dimensional rectangular array of vertical resonant cavities is fabricated on a planar substrate (FIG. 1c-e). Each nanowire is surrounded by four closest neighbors corresponding to two resonant cavities per nanowire. The vertical wire geometry enables large area fabrication (FIG. 1d) and far field optical characterization.

FIG. 1 shows the plasmon pumped laser concept. In FIG. 1a, the active material (laser dye) is pumped by a plasmon standing wave formed along a vertical nanocavity. The plasmon is excited by an external pump beam and laser light is emitted normal to the surface. In FIG. 1(b), a single plasmon resonant cavity is based on a two-nanowire waveguide. The separation medium is air of dielectric permittivity 1. Nanowire thickness is approximately 340 nm, and the height ranges from 250 to 1000 nm. The wave vector of the incident light is oriented along the waveguide in the transverse magnetic mode. FIG. 1(c) shows a rectangular array of cavities on a planar substrate. Arrows indicate the lattice vectors of the array. FIG. 1(d) shows a large area fabrication of the plasmon nanocavities on a four-inch diameter substrate. FIG. 1(e) shows a side view of photoresist nanowires fabricated by laser interference lithography, and FIG. 1 (f) gives a top view of a metallic nanowire cavity array coated with gold. The wire center-to-center distance is 360 nm and the edge to edge gap is 35 nm.

A two dimensional rectangular array of vertical resonant cavities can be fabricated on a planar substrate as shown in FIGS. 1B-1E. Each nanowire has four closest neighbors corresponding to two resonant cavities per nanowire, for a density on the order of $3.85 \times 10^8$ cavities/cm². Vertical wire geometry can enable large area fabrication (as shown in FIG. 1D) and far field optical characterization. No inter-coupling between cavities is expected in these structures, since the size of the nanowires can be an order of magnitude larger than a penetration depth of the electric field in a metal coating of the nanowires.

Photoresist wire arrays are patterned on a silicon substrate or on a fused silica substrate using laser interference lithography under conditions described previously (see Fernandez et al., J. Vacuum Sci. Technol. B 1997, 15, 729 incorporated by reference herein in its entirety). The pattern can be transferred onto the substrate by reactive ion etching, etching away portions of the substrate which are not covered by the photoresist wire arrays, thus creating silica nanowire arrays. Nanowires are coated with a dielectric film such as alumina, for example using atomic layer deposition or sputtering of the metal to fill in the gaps, so that inter-wires gap is approximately 75 nm, in a non-limiting example. Since alumina deposition is self-limiting, thickness of the alumina can be increased in conformal single molecule layer steps. Finally, a 20-40 nm thick metal coating (e.g., gold, silver, or aluminum) is deposited by sputtering until an edge to edge distance between adjacent wires approaches 20-40 nm. Gold is useful in some applications, such as spectroscopy, since it is chemically inert. Dielectric deposition is very conformal, and provides uniform coverage while gold tends to deposit more heavily on top of the structure. Thus dielectric deposition can be performed prior to gold deposition. Gold or any other metal can also be sputtered directly onto the substrate without prior alumina deposition.

Thus, the 2-D array is a plasmonic structure comprising: a planar substrate; and an array of metal-coated dielectric nanowires end-connected substantially orthogonally to the planar substrate and in parallel arrangement with each other so that plasmon resonant gap-cavities capable of supporting propagation of gap plasmon modes are formed between adjacent pairs of said nanowires with one end of each of said plasmon resonant gap-cavities delimited by a surface of the planar substrate and another end of each of said plasmon resonant gap-cavities open ended. The nanowires are tuned to have a set aspect ratio and spacing so that said plasmon resonant gap-cavities are tuned to have a predetermined longitudinal length and width for a predetermined plasmon wavelength and a predetermined cavity order. Normally, the delimiting surface of the planar substrate is a reflective surface. In embodiments, the nanowires have substantially hemispherical caps at the open ends. In certain embodiments, the plasmon resonant gap-cavities have a width measured between said adjacent pairs of nanowires that is less than about 50 nm.

In various embodiments, the plasmon resonant gap-cavities have a length measured between the delimited and open ends that is substantially an odd multiple of quarter plasmon wavelengths. In a particular embodiment, the planar substrate is a silica substrate, and the metal-coated dielectric nanowires are gold-coated, silver-coated, or aluminum coated silica nanowires, and optionally have an intermediate alumina layer between the silica and the metal coating.

Figure 2:
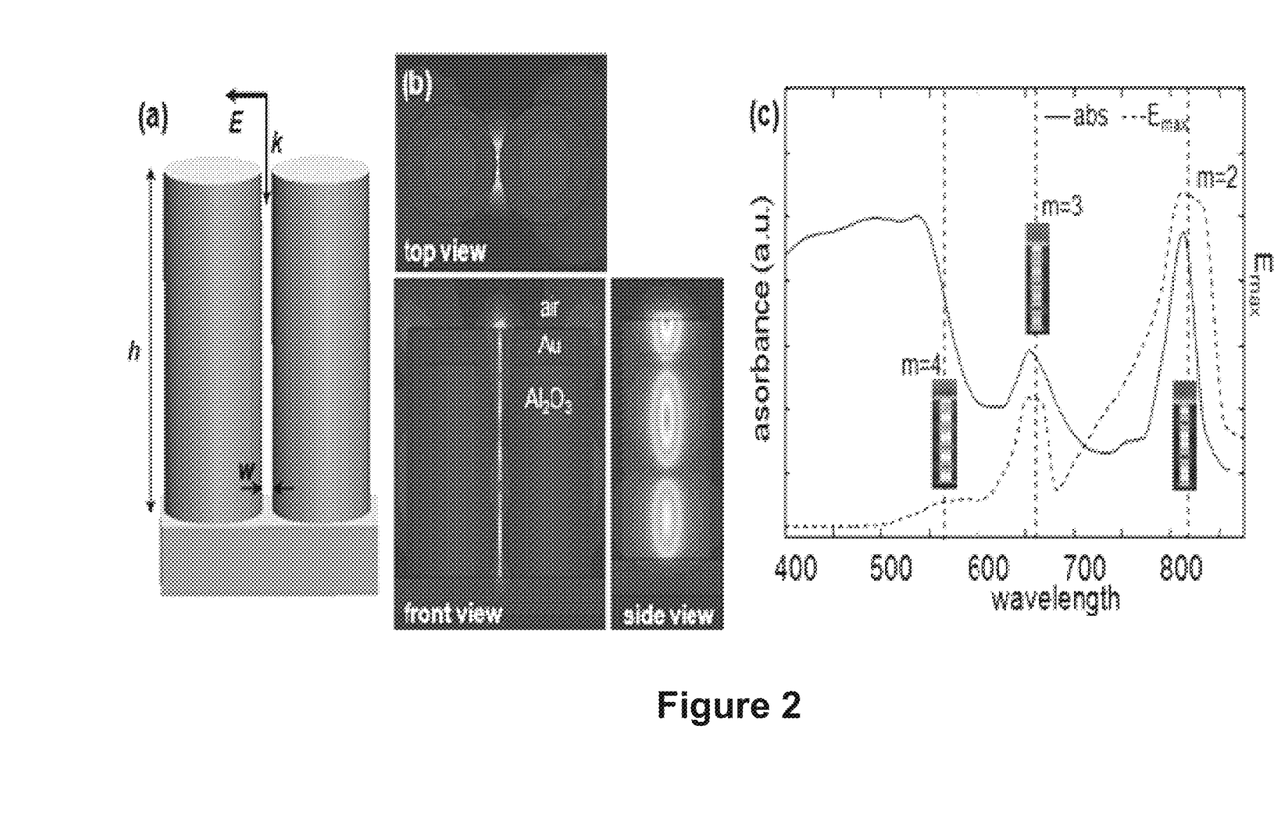
FIG. 2 illustrates plasmon modes and how they propagate in the space between wires. of the rectangular array.

Numerical simulations were carried out for MDM slot waveguides of height 500 nm and width 20 nm under excitation light normally incident on the substrate surface in the transverse magnetic mode (FIG. 2a). Resonant modes are observed in the plots of the electric field amplitude when standing plasmonic waves are formed, (FIG. 2b,c). Peaks are observed for resonances of order m=2 (785 nm), m=3 (620 nm) and m=4 (565 nm). The wavelength dependence of the substrate absorbance, calculated as the heat dissipation in the metallic material, and the electric field amplitude show peaks at the same location. This finding allows correlation of the near-field properties of the plasmonic cavity using far field characterization techniques such as reflectance and transmission. The high field enhancement in the nanocavity favors non-radiative coupling between plasmon modes and dye exciton dipoles for a more efficient pumping of active medium.

Figure 3A:
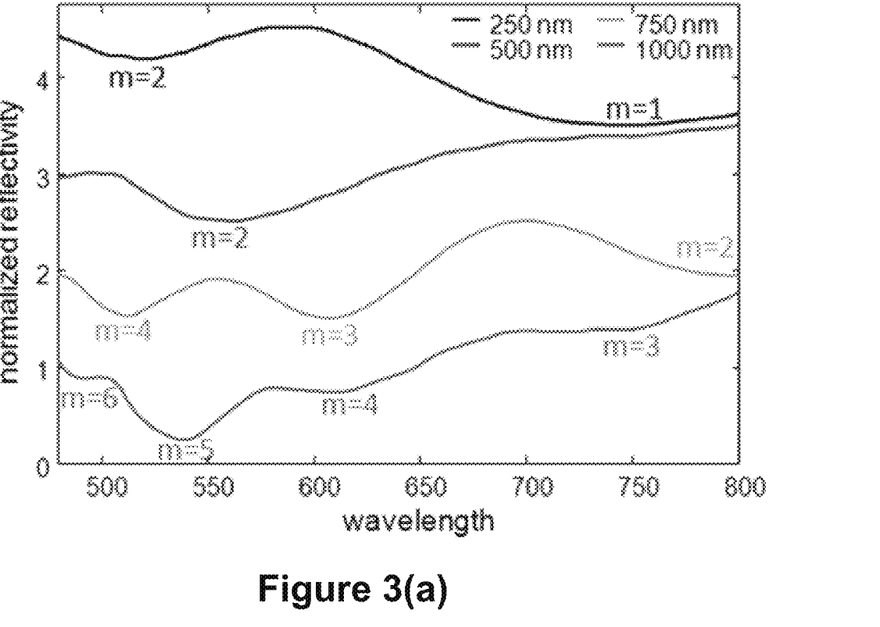
FIG. 3(a) illustrates nanocavity resonances based on normalized reflectance.

The nanowire cavity array substrates were optically characterized by measuring the wavelength dependent normal incidence reflectance spectra. Reflectivity plots were normalized to a 100 nm thick gold film to account for material specific absorbance (FIG. 3). Excitation of plasmons within the cavity increases the extinction coefficient of the substrate and resonances are observed as minima in the reflectivity data. The cavity order was identified using numerical simulations and the analytical expression of the dispersion curve.

The resonance of the plasmon cavity is aligned with the absorbance band of the dye used in the gain medium. For Rhodamine 6G, that absorption is at 532 nm. The plasmon resonance condition can be changed by modifying either the wire height or separation. The first will alter the cavity length, while the second will change the plasmon propagating wave vector according to the dispersion relation. For a vertical wire cavity of given height and separation, resonances of monotonically decreasing order are observed with increasing excitation wavelength, the highest order resonances being located towards the blue side of the spectrum.

The resonances also depend on the type of metal used to coat the nanowires of the device. For example, devices fabricated in gold nanowires in air show resonance tuning from 500 to 800 nm. Alternatives to gold include silver and aluminum. Silver has a higher plasma frequency than gold, allowing tuning of plasmon resonances at shorter wavelengths. In addition silver has lower absorbance losses at 532 nm, which will increase the resonator quality factor.

The nanocavity will operate in several solvents such as methanol, which will increase the minimum resonant wavelength.

Stimulated Emission in Plasmon Pumped Dye Laser

Figure 3B:
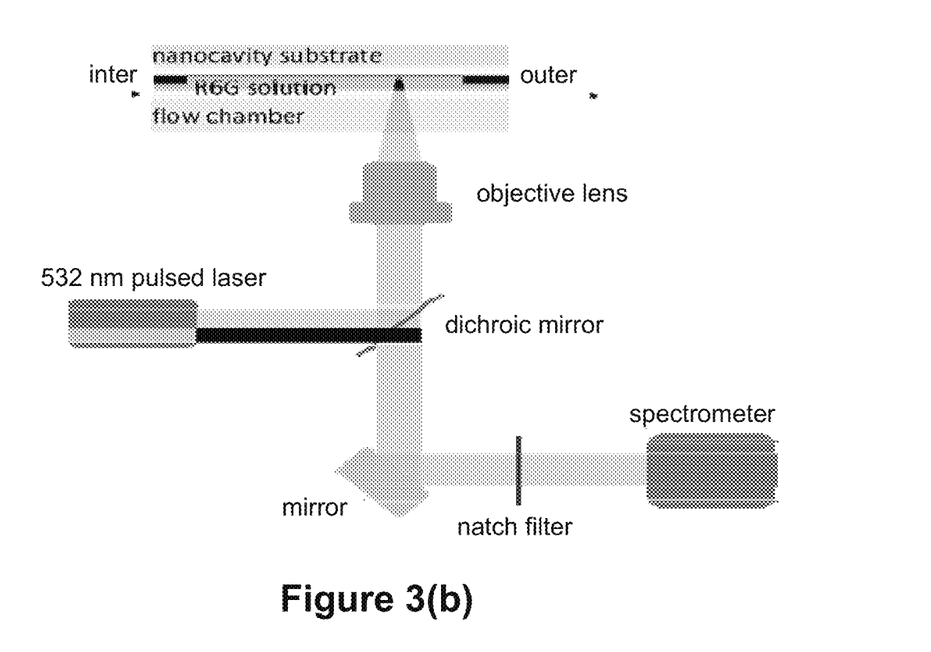
FIG. 3(b) shows an experimental laser set-up.

A plasmonic laser system is shown in FIG. 3(b) for carrying plasmon pumped laser measurements. the nanocavity substrate is a 2-D array of vertical resonant cavities as shown in FIG. 1. The dye is in a flow chamber dispose so as to deliver the solution to the nanocavities. Surface plasmon resonances are excited on the substrate nanocavities by external excitation with a source of pumping radiation, for example a 532 nm pulsed laser source. The emission is recorded by a linear detector array spectrometer. It is expected to observe a narrowing of the dye emission spectrum with the increase in the excitation power.

In addition to its dependence on the geometry of the rectangular array of vertical resonant cavities, and on the nature of the metal coating the nanowires, the plasmon wavelength can be adjusted by changing the refractive index of the solution holding the dye inside the cavity. Experimentally, a mixture of two solvents can be used, and the proportions varied in order to tune the plasmon frequency. As an example, a mixture of methanol and DMSO (dimethylsulfoxide) is used to tune the exact location of the plasmon resonance in real time. The tuning is implemented for example using a microfluidic PDMS pre-mixing chamber and a sample flow chamber integrated with the nanocavity substrate. The advantage of the open plasmonic cavity is real time tuning by modifying the refractive index of the dielectric in the cavity. The cavity height dependence of the resonant wavelength can thus be used as a coarse tuning, while the refractive index dependence will fine tune the spectral location of the plasmon resonance.

The plasmon pumped laser has the potential to break the diffraction limit size for active lasing optical devices and achieve both record dimension and wafer density. In addition, large area coherent emission can provide a path towards high power diode arrays. A dramatic reduction in size is realized The wavelength of the plasmonic emission is comparable to that of the lasers, but the confinement is higher because related to localized electronic oscillations. Due to strong confinement to metallic nanostructures there is a three orders of magnitude reduction in cavity mode volume and an increase in the amplitude of the electric field.

Figure 4:
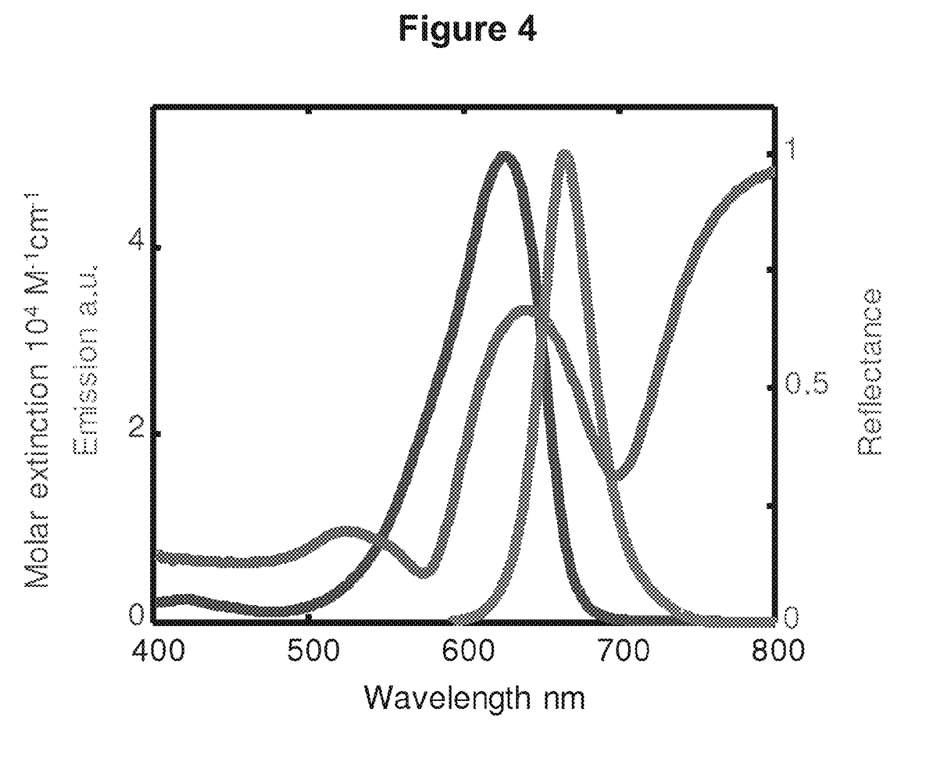
FIG. 4 illustrates alignment of resonances with absorption and emission.

Operation of the enhancement of absorption and emission by aligning with plasmonic resonances is illustrated by the curves in FIG. 4. The two bell-shaped curves illustrate the absorbance (extinction) peak of a dye in the gain chamber (left curve) and the emission peak of the same dye (right peak). The third curve is a representation of a reflectance curve that might be observed from the two-D array of vertical resonant cavities as shown in FIGS. 1 and 2, as a function of wavelength. The minima of the reflectance curve correspond to resonances that enhance the process it is aligned with. For best enhancement of absorption, a plasmonic resonance should align with the absorption peak; for best enhancement of the emission, a plasmonic resonance should align with the emission peak. The positions of the reflectance minima are influenced by the geometry of the array, the nature of the metal coating the nanowires of the array, and optical factors such as the index of refraction of the gain medium. The position of the absorption and emission peaks depends upon the nature of the dye used in the gain medium. These parameters can be varied to find a match where the resonances align as well as possible to the dye absorption and emission.

In an ideal case, the minima of the reflectance would occur at the precise wavelengths of absorption and emission, and there would 100% alignment for optimum enhancement. In the real world, 100% alignment may not be achievable in all cases. Where 100% alignment is missing, it is still possible to achieve enhancement by reaching substantial alignment. Substantial alignment occurs when the reflectance of the array is below a certain threshold at wavelengths where the absorption or emission is above a certain threshold. To illustrate, consider FIG. 4. It shows that the array has a reflectance of 0.5 at the peak emission wavelength of the dye. It further shows a reflectance slightly above 0.5 at the wavelength of the absorption peak. It further shows a minimum in the reflectance curve, giving a reflectance of about 0.1 at wavelength where the absorption is only about one third of its peak.

In various embodiments, substantial alignment of the plasmonic resonance(s) with the absorption or emission peak is achieved when, a two-D array of vertical resonance cavities has a reflectance below 0.5, below 0.3, or below 0.15 at the same wavelength that the respective absorption or emission peak of the dye is above 20%, above 30%, above 40% or above 50% of its peak height. If a system does not fall within one of these categories of substantial alignment, or if it does and it is desired to further enhance the absorption and emission (and ultimately the intensity of laser light emitted from the plasmonic laser), then the resonance can be tuned and/or the dye or refractive index of the dye solution can be varied to achieve better or more complete alignment.

Figure 5:
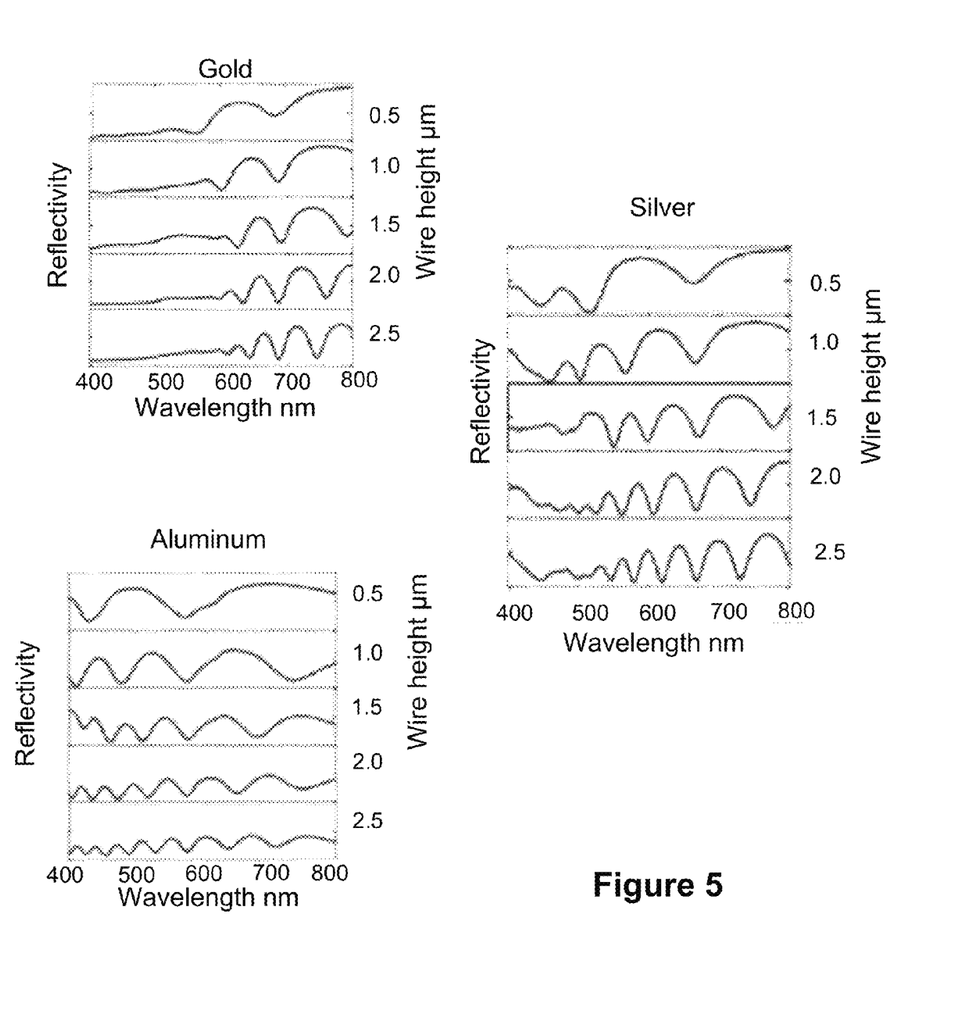
FIG. 5 illustrates dependence of resonances on system parameters.

Various factors affecting the position of the nanocavity resonance are illustrated in FIG. 5. It shows the results of a simulation calculation of the reflectivity of a 2-D nanoarray as in FIG. 1 as a function of the height of the nanowires (wire height) and as a function of the metal that is used to coat the nanowires. The simulation of FIG. 5 allows one to choose a metal and a wire height in order to best match or align with absorption peaks and emission peaks of the dye chosen for the gain medium. As discussed above, it will normally be desirable to select an array having a region of less than 50%, less than 40%, less than 30%, or less than 20% reflectance at a wavelength both where the absorbance is at least 20% maximum and where the emission is at least 20% maximum.

In addition to the flexibility to choose suitable parameters and systems on the basis of FIG. 5, remember that the resonances can also be tuned by varying the refractive index of the solvent system used in the gain medium along these lines, a dual solvent system can be used and the proportion of each varied to achieve a desired index of refraction and nanocavity resonance.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A plasmonic laser comprising plasmon resonant cavities filled with an active gain medium, wherein the plasmon resonant cavities comprise:
   a planar substrate; and
   an array of metal-coated dielectric nanowires end-connected substantially orthogonally to the planar substrate and in parallel arrangement with each other so that plasmon resonant gap-cavities capable of supporting propagation of gap plasmon modes are formed between adjacent pairs of said nanowires with one end of each of said plasmon resonant gap-cavities delimited by a surface of the planar substrate and another end of each of said plasmon resonant gap-cavities open ended, and
   wherein the gain medium comprises a solution of an organic dye having an absorption maximum at a first wavelength and an emission maximum at a second wavelength,
   wherein absorption at the first wavelength produces a population inversion in the gain medium, and
   wherein the plasmon resonant cavities have a plasmon resonance or resonances that substantially align with the absorption and emission maxima of the dye.

2. The plasmonic laser of claim 1, wherein said nanowires are tuned to have a set aspect ratio and spacing so that said plasmon resonant gap-cavities are tuned to have a predetermined longitudinal length and width for a predetermined plasmon wavelength and a predetermined cavity order.

3. The plasmonic laser of claim 1, wherein the delimiting surface of the planar substrate is a reflective surface.

4. The plasmonic laser of claim 1, wherein said nanowires taper to a reduced diameter at the open ends of the plasmon resonant gap-cavities.

5. The plasmonic laser of claim 4, wherein said nanowires have substantially hemispherical caps at the open ends.

6. The plasmonic laser of claim 1, wherein said plasmon resonant gap-cavities have a width measured between said adjacent pairs of nanowires that is less than about 50 nm.

7. The plasmonic laser of claim 1, wherein said plasmon resonant gap-cavities have a length measured between said delimited and open ends that is substantially an odd multiple of quarter plasmon wavelengths.

8. The plasmonic laser of claim 1, wherein said planar substrate is a silica substrate, and said metal-coated dielectric nanowires are gold-coated silica nanowires with an intermediate alumina layer between the silica and the gold coating.

9. The plasmonic laser of claim 1, wherein the gain medium comprises a solution of the dye in two or more solvents.

10. The plasmonic laser of claim 9, wherein the solution comprises methanol and dimethylsulfoxide.

11. A method of operating a plasmonic laser according to claim 1, comprising providing the plasmon resonant cavities and determining their plasmon resonances, selecting a dye for the gain medium, the absorption and emission maxima of which substantially align with the plasmon resonances, and pumping the active gain medium to achieve population inversion.

12. A plasmon laser device comprising a metal covered nanocavity filled with a dye solution, wherein the absorption maximum and emission maximum of the dye substantially align with a plasmon resonance of the nanocavity, and wherein absorption of radiation by the dye produces a population inversion in the gain medium.

13. The plasmon laser device of claim 12, wherein the metal is gold, silver, or aluminum.

14. The plasmon laser device of claim 12, wherein the dye is Rhodamine 6G.

15. The plasmon laser device of claim 12, wherein the nanocavity comprises nanowires of diameter less than 1 micron and spaced apart by 20-50 nm by closest contact and attached to a mirrored substrate.

16. A plasmonic laser comprising plasmon resonant cavities filled with an active gain medium, wherein the plasmon resonant cavities comprise:

a planar substrate; and an array of metal-coated dielectric nanowires end-connected substantially orthogonally to the planar substrate and in parallel arrangement with each other so that plasmon resonant gap-cavities capable of supporting propagation of gap plasmon modes are formed between adjacent pairs of said nanowires with one end of each of said plasmon resonant gap-cavities delimited by a surface of the planar substrate and another end of each of said plasmon resonant gap-cavities open ended, wherein absorption of radiation by the gain medium produces a population inversion in the gain medium.

17. The plasmonic laser of claim 16, wherein the gain medium comprises quantum dots.

\* \* \* \* \*